US008800681B2

(12) United States Patent
Rousson et al.

(10) Patent No.: US 8,800,681 B2
(45) Date of Patent: Aug. 12, 2014

(54) FASTENING TOOL WITH AN INTERNAL COMBUSTION ENGINE WITH A UNIQUE OPENING AND CLOSING CHAMBER ABUTMENT

(75) Inventors: Ludovic Rousson, Saint Lager Bressac (FR); Pierre Cordeiro, Livron sur Drome (FR); Alain Vettoretti, Bourg les Valence (FR); Patrick Herelier, Saint Jean de Muzols (FR)

(73) Assignee: Societe de Prospection et d'Inventions Techniques Spit, Bourg les Valence (FR)

( * ) Notice: Subject to any disclaimer, the term of this patent is extended or adjusted under 35 U.S.C. 154(b) by 343 days.

(21) Appl. No.: 12/956,883

(22) Filed: Nov. 30, 2010

(65) Prior Publication Data

US 2011/0139848 A1 Jun. 16, 2011

(30) Foreign Application Priority Data

Dec. 11, 2009 (FR) ..................................... 09 58904

(51) Int. Cl.
*B23Q 5/00* (2006.01)

(52) U.S. Cl.
USPC ................................ 173/144; 173/10; 173/18

(58) Field of Classification Search
CPC .......... B25C 1/08; B25C 1/008; B25C 1/003; B25C 1/005; F02D 13/04
USPC ............ 227/9–11, 1, 142, 19, 119; 173/4, 10, 173/11, 13–18, 45–47, 53, 90, 141, 144, 173/213
See application file for complete search history.

(56) References Cited

U.S. PATENT DOCUMENTS

| | | | | |
|---|---|---|---|---|
| 3,012,549 A * | 12/1961 | Bard et al. | ..................... | 173/209 |
| 3,042,008 A * | 7/1962 | Liesse | ........................ | 123/46 SC |
| 4,377,991 A * | 3/1983 | Liesse | ........................ | 123/46 SC |
| 4,483,280 A * | 11/1984 | Nikolich | .................... | 123/46 SC |
| 4,522,162 A * | 6/1985 | Nikolich | .................... | 123/46 SC |
| 5,191,861 A * | 3/1993 | Kellerman et al. | ....... | 123/46 SC |

(Continued)

FOREIGN PATENT DOCUMENTS

| | | |
|---|---|---|
| EP | 0527559 A1 | 2/1993 |
| EP | 1502709 A1 | 2/2005 |
| FR | 2858261 A1 | 2/2005 |

OTHER PUBLICATIONS

CA Office Action, dated Aug. 27, 2012, issued in CA Application No. 2,725,022.

(Continued)

*Primary Examiner* — Robert Long
(74) *Attorney, Agent, or Firm* — Lowe Hauptman & Ham LLP

(57) ABSTRACT

The tool is to be used for driving fastening members into a supporting material. It comprises a cylinder (3), with a piston (5), a combustion chamber (1, 11), a cylinder head (12) bearing a fuel igniting means (36) in the chamber (1), a pin guide (9), for receiving a fastening member and the piston (5) shaft (7) and a cage (21). Return means are provided for opening the chamber (11), driving the pin guide (9) forwardly, opening and closing abutment means for the chamber (11). There are provided:

- one single central spring (32) for opening the chamber (11) and,
- on each side of the tool, one single opening and closing side chamber abutment (18, 55), integral with the chamber (11) and mobile in translation on the corresponding side of the cylinder (3).

9 Claims, 3 Drawing Sheets

(56) References Cited

U.S. PATENT DOCUMENTS

| | | | | |
|---|---|---|---|---|
| 6,138,887 | A * | 10/2000 | Nayrac et al. | 227/8 |
| 6,247,626 | B1 * | 6/2001 | MacVicar | 227/10 |
| 6,318,615 | B1 * | 11/2001 | Walter | 227/10 |
| 6,964,362 | B2 * | 11/2005 | Shkolnikov et al. | 227/130 |
| 7,121,441 | B2 * | 10/2006 | Nayrac et al. | 227/8 |
| 7,305,940 | B2 * | 12/2007 | Nishikawa et al. | 123/46 H |
| 7,424,870 | B2 * | 9/2008 | Odoni et al. | 123/46 SC |
| 7,841,500 | B2 | 11/2010 | Ho | |
| 8,464,806 | B2 * | 6/2013 | Rousson et al. | 173/142 |
| 2005/0023320 | A1 * | 2/2005 | Nayrac et al. | 227/8 |
| 2005/0156007 | A1 * | 7/2005 | Nishikawa et al. | 227/10 |
| 2007/0240683 | A1 * | 10/2007 | Zahner et al. | 123/46 H |
| 2010/0096429 | A1 | 4/2010 | Ho | |
| 2010/0187280 | A1 * | 7/2010 | Akiba et al. | 227/10 |
| 2010/0230461 | A1 * | 9/2010 | Tanaka | 227/9 |
| 2011/0139848 | A1 * | 6/2011 | Rousson et al. | 227/10 |
| 2011/0139849 | A1 * | 6/2011 | Rousson et al. | 227/10 |

OTHER PUBLICATIONS

French Search Report for FR 0958904 dated Jun. 4, 2010.

* cited by examiner

FASTENING TOOL WITH AN INTERNAL COMBUSTION ENGINE WITH A UNIQUE OPENING AND CLOSING CHAMBER ABUTMENT

The invention relates to a hand fastening tool for driving fastening members into a supporting material, comprising an internal combustion engine with a chamber used for receiving a dose of fuel, which, when being fired, results in a propelling piston being moved in a cylinder which, in turn, will drive in motion a fastening member.

The invention relates to hand tools of the nailing or stapling machine type, for instance.

Firing fuel, coming from a cartridge housed in the tool, occurs with a sparkling plug supported by a rear cylinder head. Such firing can only occur after the chamber is closed, namely after the chamber has been driven in motion to the rear against the cylinder head. Such a motion of the chamber occurs while putting the tool in abutment against the supporting material, which pushes back the pin guide to the rear, being the part through which the abutment occurs, the pin guide driving with it, through a yoke, a cage the chamber is integral with. It is to be noticed that the space for receiving the fuel and the mobile wall of the tool allowing for such a space to be limited are both indiscriminately referred to as a chamber.

When moving forwards, when the operator opens the tool, the chamber comes in abutment against the cylinder through an abutment part. Upon moving to the rear, the chamber, as seen hereinabove, comes in abutment against the cylinder head. Such a rear abutment often occurs suddenly, optionally resulting in one or the other part breaking. It has already been suggested, as in document FR 2,858,261, to provide an intermediate rear abutment part, but to the detriment of the tool simplicity.

The invention of the present application thus aims to provide a tool of the hereinabove defined type with a simple construction, wherein the chamber is able to come in front abutment and in rear abutment altogether safely.

Before presenting the invention, it is to be reminded that moving the chamber forwards, upon opening of the tool, occurs via return means acting on the pin guide for pushing the latter forwardly and driving the cage and the chamber to an opening position.

Now, the invention thus relates to an internal combustion engine fastening tool, for driving fastening members into a supporting material, comprising a cylinder, wherein a propelling piston is slidably mounted, a combustion chamber arranged for being supplied with fuel, a rear cylinder head bearing a fuel igniting means in the chamber after the closing thereof against the cylinder head and the closing of the tool, a pin guide mobile in translation for receiving a fastening member and the piston shaft, and a cage, integral in translation, at the rear, with the chamber and, at the front, with the pin guide, return means being provided for, upon opening of the tool, opening the chamber driving the pin guide forwards, opening and closing abutment means being also provided for the chamber, characterised in that it comprises:

one single central spring for opening the chamber and, on each side of the tool, one single opening and closing side chamber abutment, integral with the chamber and mounted mobile in translation on the corresponding side of the cylinder.

By means of this invention, the tool could be very simply mounted, with an easy maintenance and an attractive cost.

In the preferred embodiment of the tool of the invention, the opening spring is mounted in rear abutment against the cylinder and in front abutment against an intermediate yoke with which the cage is fixed.

Advantageously, each chamber abutment is arranged for sliding on a path provided on the side of the cylinder; the sliding path could be a groove formed at the surface of the cylinder and the abutment comprises a pad engaged in the groove or a slide provided on the cylinder and the abutment comprises a pad wherein there is arranged a groove for receiving the slide.

The abutments of the opening and closing chamber could be stiff or made in a damping material.

The invention will be better understood from the following description of the preferred embodiment of the tool of the invention, with reference to the appended drawing, in which.

Figure 1:
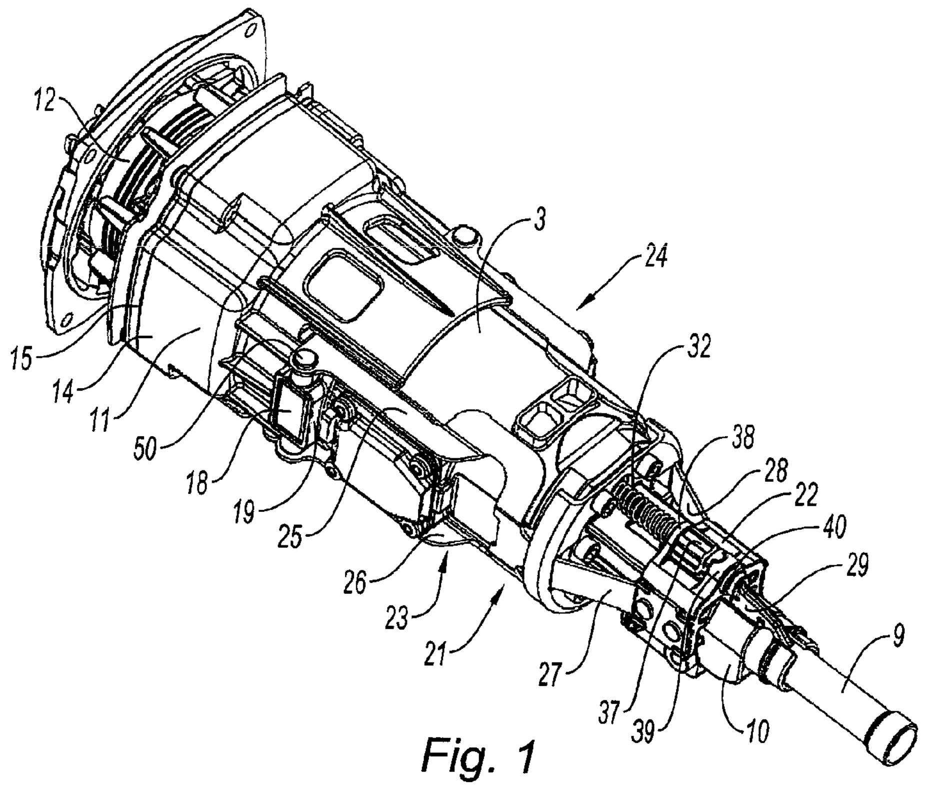
FIG. 1 is a perspective view of the tool, with the chamber being opened.
Figure 2:
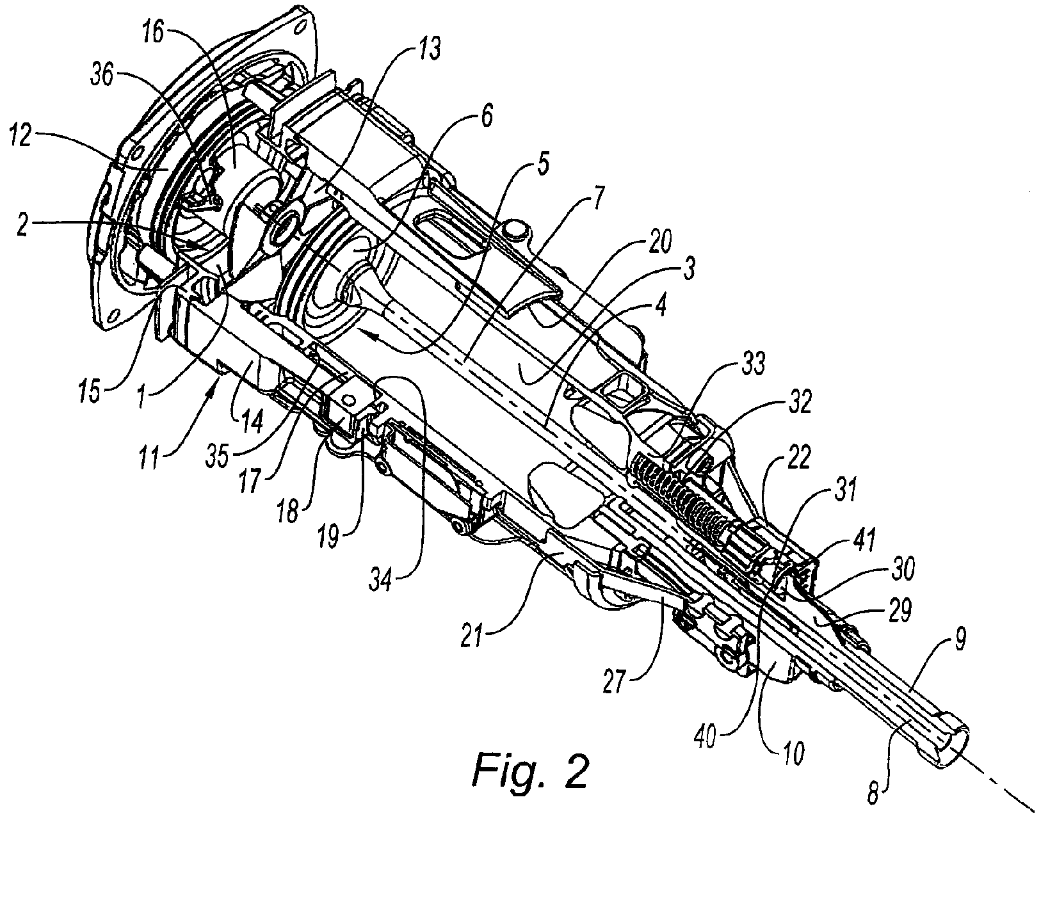
FIG. 2 is a three quarter section view, with the chamber being opened.
Figure 3:
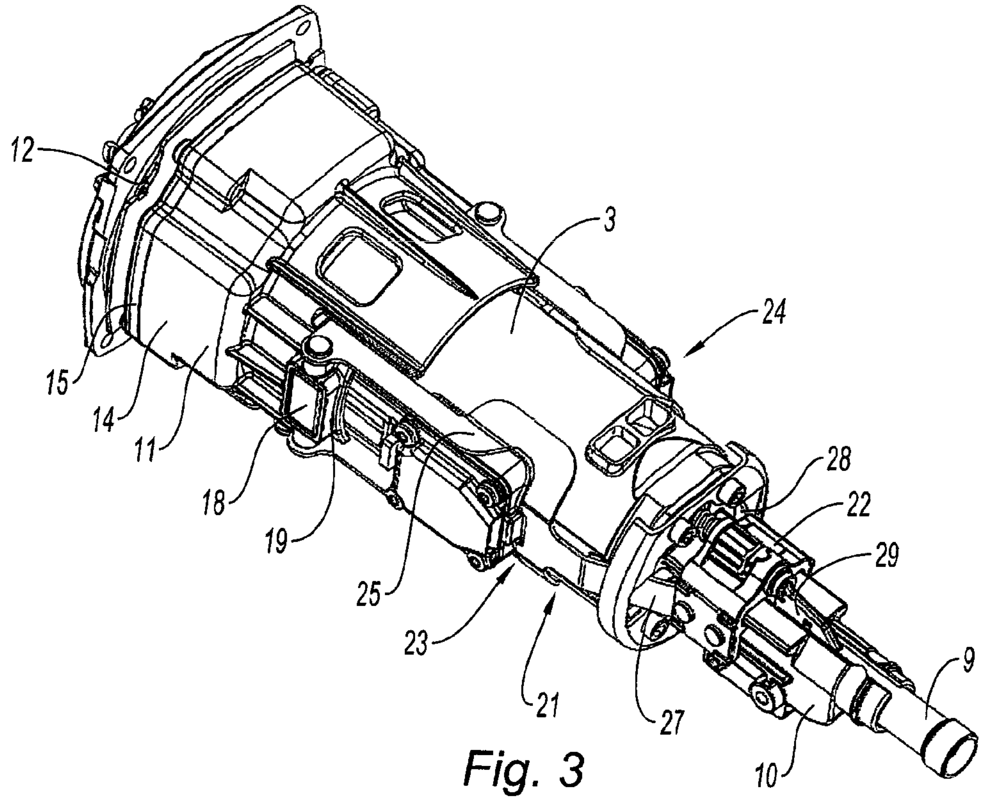
FIG. 3 is a perspective view of the tool, with the chamber being closed.

The tool that will be now described is a nailing machine for driving nails into a supporting material against which the tool should be abutted for allowing firing of a dose of a mixture of air and fuel preliminarily introduced into a combustion chamber 1 of an internal combustion engine 2 of the tool (FIG. 2). The engine comprises a cylinder 3 of axis 4, wherein there is a piston 5, slidably mounted, with a head 6 and a shaft 7 extending along the axis 4 and engaged in an axial bore 8 of a pin guide 9 in which a nail has been introduced, intended for being driven, by the piston stem 7, into the supporting material. The pin guide 9 is slidably mounted in a support 10 fixed at the front of the cylinder 3.

The engine 2 further comprises a chamber wall 11 of axis 4 (also referred to as a chamber), slidably mounted on the cylinder 3 for forming the combustion chamber 1 between the wall 11, the piston head 6 and a rear cylinder head 12 bearing a sparkling plug 36 for the mixture in the chamber 1 for firing the mixture, propelling the piston 5 and driving the nail introduced into the pin guide 9. Incidentally, the tool that will be now described comprises, in the chamber 1, a fan 13, with its motor 16, ensuring a blending function and a cooling function. The chamber wall comprises a front part 14 and a rear part 15 intended to receive the cylinder head 12.

At the periphery of the cylinder 3, there have been provided two diametrically opposed side grooves 17 axially extending along a distance substantially equal to the stroke of the chamber wall between its chamber opening position and its chamber closing position. Each groove 17 is arranged between two ribs 51, 52 extending on the surface of the cylinder.

Figure 5:
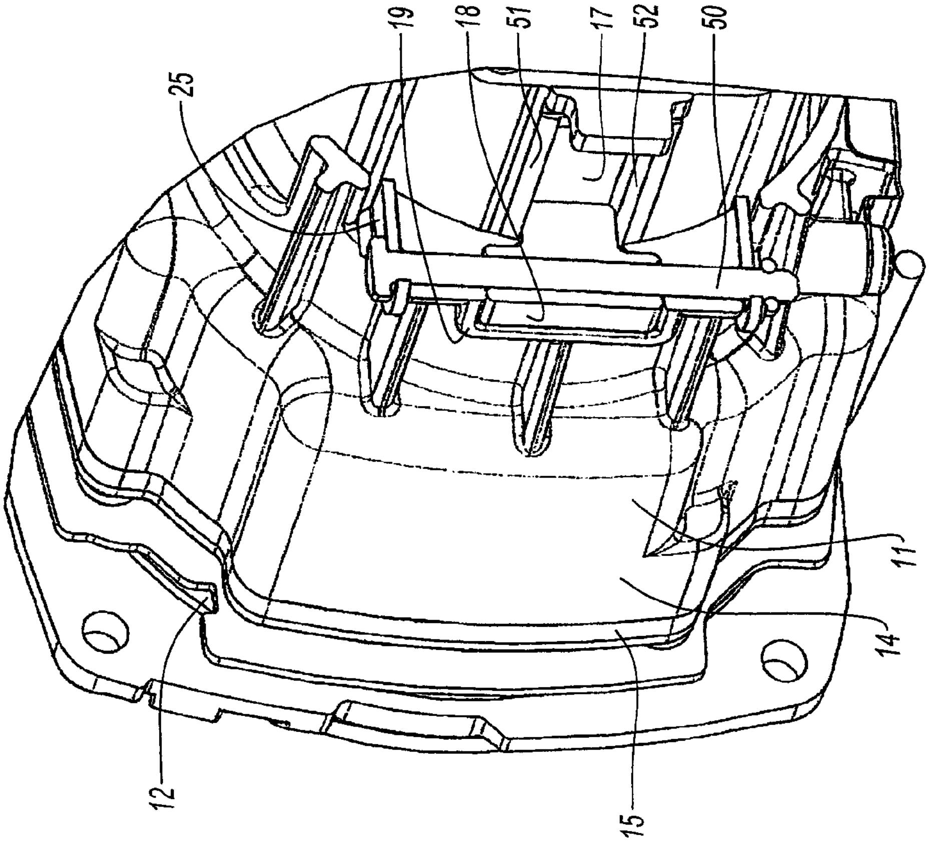
FIG. 5 is a view, in a larger scale, of the first embodiment of the chamber abutment and the sliding path thereof.

The chamber wall 11, in the front part 14, is arranged on both diametrically opposed lateral sides corresponding to both grooves of the cylinder, for receiving a side chamber abutment 18 projecting inside the corresponding cylinder groove 17 located on the same side of the axis 4 of the tool (FIG. 5). Both chamber abutments 18 have the form of blocks, or pads, here made in a damping material. More precisely, each chamber abutment 18 is housed in a casing 19 formed near the front edge 20 of the front part 14 of the chamber wall 11. The casing 19 is fixed to the corresponding lower part 25 (26) of the cage 21 by a pin 50.

The chamber wall 11 is fixed at the rear of a chamber closing—opening cage 21, fixed, at the front, to an intermediate cage yoke 22. The cage 21 here comprises two pairs 23, 24 of side rear arms adapted to move at the surface of the cylinder 3, both arms 25, 26 of each pair being fixed at the rear here on the receiving casing 19 of the chamber abutment 18 located on the same side. Both rear arms 25, 26 of each pair 23, 24 meet into two forearms 27, 28 fixed, at the front, to the yoke 22. The cage yoke 22 is mounted mobile in translation on the support 10 of the pin guide. It is thus integral with the cage 22 in translation both forwards and backwards. It is only integral in translation with the pin guide 9 forwardly, or conversely, the pin guide 9 is only integral in translation with the yoke 22 backwardly. This latter integral relationship here occurs via a rear supporting leg 29 of the pin guide 9. More precisely, the cage yoke 22 bears a knurl 37 for adjusting the depth of drive of the front end of the piston shaft 7 outside the front end of the pin guide 9. But this is not the object of the invention of the present application.

The knurl 37 is rotatably mounted between a rear bridge 38 and a front bridge 39 of the cage yoke 22 acting as bearings for a knurl shaft 31 (FIG. 2) mounted on these bearings. The rear portion of the knurl shaft 31 acts as a guide for a spring 32 for opening the chamber and prevents such a spring from buckling.

The front portion of the shaft 31 of the knurl 37 comprises, at its end, a thrust disk 30 for the pin guide 9, the peripheral edge of said disc forming a rear supporting edge 40 against the front bridge 39 of the cage yoke 20. For cooperating with the thrust disk 30 of the knurl 31 shaft, the pin guide comprises a supporting leg 29 ending at the rear with an abutment disk 41 for receiving the thrust of the disk 30 of the knurl shaft 31.

The spring 32 is a single and central opening spring. It is mounted at the rear in abutment in a housing 33 of the front part of the cylinder 3. At the front, it abuts against the rear bridge 38 of the cage yoke 22.

Both chamber abutments 18 are single chamber opening and closing abutments.

Figure 4:
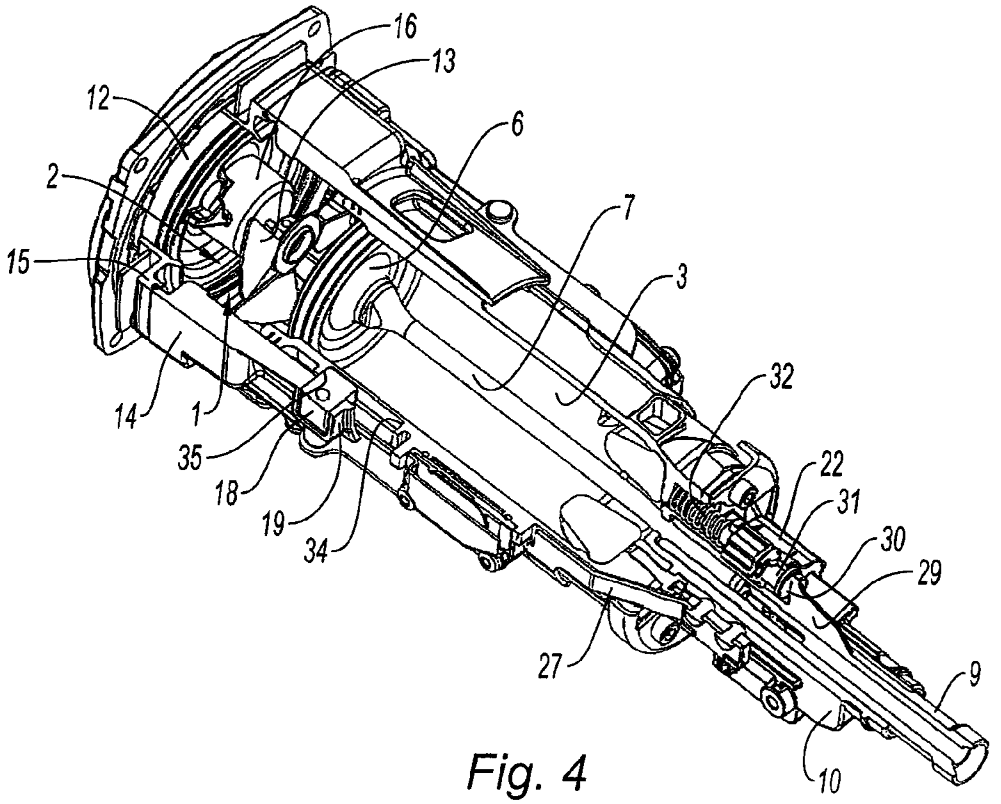
FIG. 4 is a three quarter section view, with the chamber being closed.

When the operator opens the tool, moving it apart from the supporting material, the spring 32 expands, pushes the cage yoke 22 forwardly, the cage 21 pulls the chamber wall 11, 14, 15 forwardly on the cylinder 3 until the abutments 18 come in opening abutment against the front lower part 34 of the grooves 17 (FIG. 2). In order to perform a shot, the operator puts the tool in abutment against the receiving material. The pin guide 9 is pushed back to the rear, the supporting leg thereof 29 pushes back the thrust disk 30 which, in abutment against the front part of the yoke 22, pushes back the yoke 22 to the rear; the cage 21 is pushed back as well to the rear driving the chamber wall 11 as well, until the rear 15 of the chamber wall covers the cylinder head and the chamber abutments 18 are in closing abutment against the rear lower part 35 of the grooves 17 (FIG. 4).

FIG. 5 shows a first embodiment of the chamber abutment and of the sliding path thereof being a groove formed at the surface of the cylinder, in which the abutment pad is slidably mounted.

Figure 6:
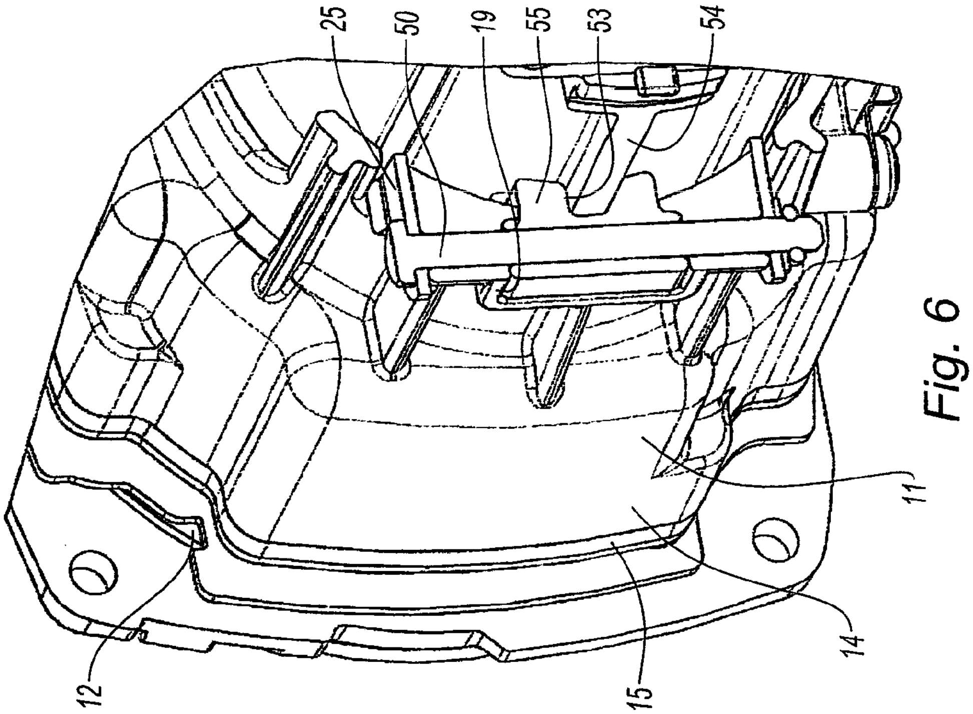
FIG. 6 is a view of a second embodiment of the chamber abutment and the sliding path thereof.

FIG. 6 shows an optional embodiment, so to say, an inverted, embodiment. This is the abutment pad 55 that comprises a groove 53, in which a slide 54 extends formed at the surface of the cylinder. The other members are identical and have the same reference numerals.

The invention claimed is:

1. A device, comprising:
a fastening tool including an internal combustion engine configured to drive a fastening member into a supporting material, including:
a cylinder;
a propelling piston slidably mounted in the cylinder;
a cylinder head;
a chamber wall; and
a pin guide having a bore therethrough through which the fastening member travels during fastening to be ejected from the fastening tool, wherein
the device is configured such that the chamber wall is movable relative to the cylinder head so as to close an opening of a combustion chamber formed at least by the interior of the cylinder, the cylinder wall and the cylinder head,
the device is configured such that that movement of the pin guide moves the chamber wall due to mechanical linkage between the pin guide and the chamber wall, thereby closing the top opening of the combustion chamber, and
the device includes abutments in fixed relationship with the chamber wall that slide along an outside of the cylinder with movement of the chamber wall relative to the cylinder.

2. The device of claim 1, wherein:
the device includes two of the abutments respectively located at least about on opposite sides of the cylinder.

3. The device of claim 1, wherein:
the device is configured such that the abutments are components that strike a first outer portion of a wall that forms the cylinder, thereby preventing further movement of the chamber wall in a first direction and strike a second outer portion of the wall that forms the cylinder, thereby preventing further movement of the chamber wall in a second direction opposite the first direction.

4. The device of claim 1, wherein:
the device is configured such that the abutments are components that move in a linear direction in a groove formed in an exterior wall that forms the cylinder with movement of the chamber wall.

5. The device of claim 1, wherein:
the abutments are elastic components.

6. The device of claim 1, further comprising:
an opening spring, wherein the device is configured such that the opening spring biases the chamber wall in a direction that opens the combustion chamber.

7. The device of claim 6, wherein:
the opening spring is mounted in rear abutment against the cylinder and in front abutment against a yoke that is in fixed relationship to a cage that is in fixed relationship with the cylinder wall.

8. The device of claim 6, wherein there is provided a guide for the opening spring.

9. The device of claim 1, wherein the pin guide is in fixed relationship with the chamber wall.

* * * * *